United States Patent
Fang et al.

(10) Patent No.: US 8,958,320 B2
(45) Date of Patent: Feb. 17, 2015

(54) METHOD AND DEVICE FOR PROCESSING A MEASUREMENT CONTEXT

(75) Inventors: Jiayi Fang, Beijing (CN); Nan Yan, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 155 days.

(21) Appl. No.: 13/265,740

(22) PCT Filed: Apr. 22, 2010

(86) PCT No.: PCT/CN2010/000560
§ 371 (c)(1),
(2), (4) Date: Jan. 4, 2012

(87) PCT Pub. No.: WO2010/121496
PCT Pub. Date: Oct. 28, 2010

(65) Prior Publication Data
US 2012/0140653 A1    Jun. 7, 2012

(30) Foreign Application Priority Data

Apr. 22, 2009 (CN) .......................... 2009 1 0082818

(51) Int. Cl.
*H04L 1/00* (2006.01)
*H04W 24/10* (2009.01)
(Continued)

(52) U.S. Cl.
CPC .............. *H04W 24/10* (2013.01); *H04W 28/04* (2013.01); *H04W 36/00* (2013.01)
USPC ....................................................... 370/252

(58) Field of Classification Search
USPC .......... 370/331, 252, 312, 332; 455/436, 525, 455/67.11, 452.2, 438, 254
See application file for complete search history.

(56) References Cited

U.S. PATENT DOCUMENTS

2007/0224993 A1   9/2007   Forsberg
2008/0267131 A1  10/2008   Kangude et al.
(Continued)

FOREIGN PATENT DOCUMENTS

CN          1997200        7/2007
CN        101087475       12/2007
(Continued)

OTHER PUBLICATIONS

Ericsson, "Connected mode measurement configuration procedure in RRC", 3GPP Draft; R2-074089 Connected Mode Measurement Configuration Procedure in RRC, 3rd Generation Partnership Project (3GPP), Mobile Competence Centre; 650, Route Des Lucioles; F-06921 Sophia-Antipolis Cedex; France, vol. RAN WG2, No. Shanhai, China; Oct. 1, 2007, XP050136719, 3 pps.
(Continued)

*Primary Examiner* — Andrew Lai
*Assistant Examiner* — Jamaal Henson
(74) *Attorney, Agent, or Firm* — Fay Kaplun & Marcin, LLP (57) ABSTRACT

A method and a device for processing a measurement context are provided by the present invention. The method includes: preparing for handover between radio access network devices in the Long Term Evolution (LTE) system (101); processing the network side measurement context between the radio access network devices (102). The application of the present invention can avoid the error resulted from the difference between the network side measurement context and the user equipment side measurement context, and can realize the interconnection between the radio access network devices of different manufacturers.

18 Claims, 6 Drawing Sheets

(51) Int. Cl.
  *H04W 28/04* (2009.01)
  *H04W 36/00* (2009.01)

(56) References Cited

U.S. PATENT DOCUMENTS

| | | | |
|---|---|---|---|
| 2009/0046656 A1* | 2/2009 | Kitazoe et al. | 370/331 |
| 2010/0232391 A1* | 9/2010 | Olsson et al. | 370/331 |
| 2012/0327810 A1* | 12/2012 | Wang et al. | 370/254 |

FOREIGN PATENT DOCUMENTS

| | | |
|---|---|---|
| CN | 101 360 343 | 2/2009 |
| CN | 101401470 | 4/2009 |
| WO | 92/01339 | 1/1992 |
| WO | 2008/055169 | 5/2008 |
| WO | 2008/157717 | 12/2008 |
| WO | 2009/021214 | 2/2009 |

OTHER PUBLICATIONS

Panasonic, "*Measurement Functionality split for Broadcast and Dedicated*", 3GPP Draft: R2-071773 Measurement Functionality Split for Broadcast and Dedicated, 3$^{rd}$ Genereation Partnership Project (3GPP), Mobile Competence Center: 650, Route Des Lucioles; F-06921 Sophia-Antipolis Cedex; France vol. RAN WG2, No. Kobe, Japan: May 4, 2007, 6pps.

3GPP TS 36.331 V8.5.0, Release 8, Mar. 2009, pp. 56-72.

"*Use of AS-Configuration Upon Handover and Connection Establishment,*"Samsung, 3GPP TSG-RAN2 Meeting #56, Riga, Latvia, Nov. 6-10, 2006, 6pps.

\* cited by examiner

METHOD AND DEVICE FOR PROCESSING A MEASUREMENT CONTEXT

CROSS REFERENCE TO RELATED APPLICATIONS

The present application is a US National Stage of International Application No. PCT/CN2010/000,560, filed 22 Apr. 2010, designating the United States, and claiming priority to Chinese Patent Application No. 200910082818.1 filed 22 Apr. 2009.

This application claims the benefit of Chinese Patent Application No. 200910082818.1, filed with the Chinese Patent Office on Apr. 22, 2009 and entitled "Method and device for processing measurement context", which is hereby incorporated by reference in its entirety.

FIELD

The present invention relates to the field of wireless communications and particularly to a method and device for processing a measurement context.

BACKGROUND

As stipulated in the Long Term Evolution (LTE) specification, a measurement control information transmitted from an evolved NodeB (eNB) to a User Equipment (UE) is composed of the following items:

measurement objects, each of which corresponds to a frequency for an Evolved UMTS Terrestrial Radio Access Network (E-UTRA) and a Universal Mobile Telecommunication System (UMTS) and a set of frequencies for a GSM/EDGE Radio Access Network (GERAN) and is provided with a separate number (obj-id);

measurement reporting configurations, each of which corresponds to a measurement reporting criterion and a set of parameters, and is provided with a separate number (report cfg-id); where, a specific reporting criterion includes event triggered reporting, periodical reporting and event triggered periodical reporting; and for example, there are report events A1, A2, etc.; and measurement identities (meas-id), each of which associates uniquely a measurement object with a measurement event and is included in each measurement report from the UE.

A specific instance is presented as follows.

1. A UE is configured, from a network, with three measurement objects with respective numbers (obj-id) of 1, 2 and 3 and with respective correspondence to E-UTRA f1/f2/f3

2. The UE is configured, from the network, with two measurement reporting configurations with respective numbers (report cfg-id) of 1 and 2, where an event A1 and a corresponding set of configuration parameters are used for the first measurement reporting configuration 1, and a periodical reporting criterion and a corresponding set of configuration parameters are used for the second measurement reporting configuration 2.

3. The UE is configured, from the network, with two measurement identities:

the first measurement identity (meas-id=1) associates the first measurement object (obj-id=1, E-UTRA f1) with the first measurement reporting configuration (report cfg-id=1, i.e., A1); and the second measurement identity (meas-id=2) associates the third measurement object (obj-id=3, E-UTRA f3) with the second measurement reporting configuration (report cfg-id=2, i.e., the periodical reporting criterion).

4. Thus, the UE will indicate in a measurement report that the measurement report is currently triggered by the measurement identity (meas-id=1) upon determining that E-UTRA f1 satisfies the configured event A1.

The foregoing measurement control information is a part of the contents in a Radio Resource Control (RRC) message for which it has been stipulated in the standard that the UE shall store the respective measurement control information received in its own measurement context (Var Measurement Configuration) referred here to as a UE-side measurement context in order to control the UE. Also a corresponding measurement context referred here to as a network-side measurement context shall be stored at the currently serving eNB in order to perform delta measurement configuring on the UE, and the UE-side measurement context and the network-side measurement context shall be kept consistent in contents.

As stipulated in the current LTE specification, the UE has to perform the following "exchange operations" on its own stored measurement context for inter-frequency switching or for inter-frequency RRC connection reestablishment:

a) all the measurement identities associated with measurement objects corresponding to destination frequencies are located and then associated onto measurement objects corresponding to source frequencies; and b) all the measurement identities associated with the measurement objects corresponding to the source frequencies are located and then associated onto the measurement objects corresponding to the destination frequencies.

The source and destination frequencies as referred here to are defined as follows.

1. For inter-frequency switching, the source frequency refers to the frequency of a cell where the UE resides prior to switching, and the destination frequency refers to the frequency of a cell where the switched UE resides after switching.

2. For inter-frequency RRC connection reestablishment, the source frequency refers to the frequency of a cell where the UE resides prior to RRC connection reestablishment, and the destination frequency refers to the frequency of a cell where the UE resides after the UE performs RRC connection reestablishment successfully.

To prepare for inter-evolved NodeBs (eNB) switching, a source base station may transmit to a destination base station its own stored UE context (AS-Configuration) including a network-side measurement context (source Measurement Configuration) as described above and also part of system information (MIB/SIB1/SIB2, where MIB stands for Master Information Block, and SIB stands for System Information Block) of a cell where the UE currently resides as well as carrying frequency information.

Generally the base station where the UE currently resides in a connected status maintains a UE context including the measurement context. The base station typically can generate desired RRC configuration information only from configuration information of its own currently stored UE context to control the UE, and after it is transmitted to and successfully confirmed by the UE, the base station shall also modify correspondingly its own stored UE context. In this way, the context stored internal to the base station can be synchronized all the time with that stored at the UE side to facilitate a subsequent control process.

When inter-frequency switching or inter-frequency RRC connection reestablishment occurs with the UE, the measurement context is updated, i.e., the foregoing exchange operations are performed, at the UE side as stipulated in the standard. In order to maintain synchronization of the UE network-side measurement context with the UE-side context, a corresponding process also has to be performed at the network side. However for inter-eNB switching or reestablishment scenario, a drawback of the prior art lies in that whether the desired process at the network side is performed by the source base station or the destination base station has not been ascertained in the existing standard, which may result in a lack of synchronization between the UE-side measurement context and the network-side measurement context after switching or reestablishment and consequently influence a subsequent control process.

The drawback of the prior art is present not only in a base station (eNB) of an LTE system but also in a radio relay node of an LTE-A system in processing the context, where LTE-A stands for LTE Release 10.

SUMMARY

The invention provides a method and device for processing a measurement context to address the issue of synchronizing measurement contexts between a radio access network device and a UE.

A method for processing a measurement context according to an embodiment of the invention includes:

preparing for switching between radio access network devices in a Long Term Evolution system; and processing a network-side measurement context between the radio access network devices.

Preferably processing the network-side measurement context between the radio access network devices includes:

a source radio access network device performing exchange operations on the network-side measurement context upon determining that a user equipment is subject to inter-frequency switching or inter-frequency Radio Resource Control, RRC, connection reestablishment, wherein the source radio access network device is the radio access network device serving the user equipment prior to the inter-frequency switching or the radio access network device serving the user equipment prior to the inter-frequency RRC connection reestablishment; and the source radio access network device transmitting to a destination radio access network device the network-side measurement context subjected to the exchange operations, wherein the destination radio access network device is the radio access network device where the user equipment resides after the inter-frequency switching or the radio access network device where the user equipment resides after the inter-frequency RRC connection reestablishment.

Preferably the method further includes:

the destination radio access network device controlling the user equipment according to information of the network-side measurement context, transmitted from the source radio access network device, subjected to the exchange operations.

Preferably processing the network-side measurement context between the radio access network devices includes:

a source radio access network device transmitting the network-side measurement context on the source radio access network device to a destination radio access network device, wherein the source radio access network device is the radio access network device serving a user equipment prior to inter-frequency switching or the radio access network device serving the user equipment prior to inter-frequency RRC connection reestablishment; and the destination radio access network device performing network-side measurement context exchange operations on the received network-side measurement context on the source radio access network device upon determining that the user equipment is subject to the inter-frequency switching or the inter-frequency RRC connection reestablishment, wherein the destination radio access network device is the radio access network device serving the user equipment after the inter-frequency switching or the radio access network device serving the user equipment after the inter-frequency RRC connection reestablishment.

Preferably the method further includes:

the destination radio access network device controlling the user equipment according to information of the network-side measurement context on the destination radio access network device subjected to the exchange operations.

Preferably processing the network-side measurement context between the radio access network devices includes:

a destination radio access network device performing full configuring on all measurement identities in the network-side measurement context, which are associated with source and destination frequencies, wherein the destination radio access network device is the radio access network device serving a user equipment after inter-frequency switching or the radio access network device serving the user equipment after inter-frequency RRC connection reestablishment, the source frequency is the frequency of a cell where the user equipment resides prior to the switching or the frequency of a cell where the user equipment resides prior to the RRC connection reestablishment, the destination frequency is the frequency of a cell where the user equipment resides after the switching or the frequency of a cell where the user equipment resides after the RRC connection reestablishment, and the full configuring is resetting of an association relationship between a measurement identity, and a measurement object and a measurement reporting criterion respectively.

Preferably the method further includes:

the destination radio access network device controlling the user equipment according to information of the network-side measurement context information on the destination radio access network device subjected to the full configuring.

Preferably processing the network-side measurement context between the radio access network devices includes:

a source radio access network device determining whether to perform exchange operations on the network-side measurement context for transmission to a destination radio access network device, wherein the source radio access network device is the radio access network device serving a user equipment prior to inter-frequency switching or the radio access network device serving the user equipment prior to inter-frequency RRC connection reestablishment;

the source radio access network device transmitting to the destination radio access network device the network-side measurement context subjected to the exchange operations together with an indicator of that the exchange operations are performed on the network-side measurement context upon determining the exchange operations to be performed; or the source radio access network device transmitting to the destination radio access network device the network-side measurement context without being subjected to any exchange operation together with an indicator of that no exchange operation is performed on the network-side measurement context upon determining no exchange operation to be performed; and the destination radio access network device performing no exchange operation on the received network-side measurement context when the received indicator indicates that the exchange operations are performed on the network-side measurement context; or the destination radio access network device performing the exchange operations on the received network-side measurement context, or the destination radio access network device performing full configuring on all measurement identities in the network-side measurement context, which are associated with source and destination frequencies, when the received indicator indicates that no exchange operation is performed on the network-side measurement context, wherein the destination radio access network device is the radio access network device serving the user equipment after the inter-frequency switching or the radio access network device serving the user equipment after the inter-frequency RRC connection reestablishment, and the full configuring is resetting of an association relationship between a measurement identity, and a measurement object and a measurement reporting criterion respectively.

Preferably the method further includes:

the destination radio access network device controlling the user equipment according to information of the network-side measurement context, transmitted from the source radio access network device, subjected to the exchange operations, when the received indicator indicates that the exchange operations are performed on the network-side measurement context; or the destination radio access network device controlling the user equipment according to information of the network-side measurement context on the destination radio access network device subjected to the exchange operations, or the destination radio access network device controlling the user equipment according to information of the network-side measurement context on the destination radio access network device subjected to the full configuring, when the received indicator indicates that no exchange operation is performed on the network-side measurement context.

Preferably processing the network-side measurement context between the radio access network devices includes:

a source radio access network device indicating in an indicator to a destination radio access network device whether to perform exchange operations on all network-side measurement contexts on the source radio access network device, wherein the source radio access network device is the radio access network device serving a user equipment prior to inter-frequency switching or the radio access network device serving the user equipment prior to inter-frequency RRC connection reestablishment; and the destination radio access network device performing no exchange operation on a received network-side measurement context when the indicator indicates that the exchange operations are performed on the network-side measurement context; or the destination radio access network device performing the exchange operations on the received network-side measurement context, or the destination radio access network device performing full configuring on all measurement identities in the network-side measurement context, which are associated with source and destination frequencies, when the indicator indicates that the exchange operations are not performed on all the network-side measurement contexts, wherein the destination radio access network device is the radio access network device serving the user equipment after the inter-frequency switching or the radio access network device serving the user equipment after the inter-frequency RRC connection reestablishment, and the full configuring is resetting of an association relationship between a measurement identity, and a measurement object and a measurement reporting criterion respectively.

Preferably the source radio access network device indicates to the destination radio access network device during setting-up of an interface between the radio access network devices.

Preferably the method further includes:

the destination radio access network device controlling the user equipment according to information of the network-side measurement context, transmitted from the source radio access network device, subjected to the exchange operations, when the indicator indicates that the exchange operations are performed on all the network-side measurement contexts; or the destination radio access network device controlling the user equipment according to information of the network-side measurement context on the destination radio access network device subjected to the exchange operations, or the destination radio access network device controlling the user equipment according to information of the network-side measurement context on the destination radio access network device subjected to the full configuring, when the indicator indicates that no exchange operation is performed on the network-side measurement context.

Preferably the radio access network devices are a base station and/or a radio relay node.

A radio access network system according to another embodiment of the invention includes:

a source radio access network device configured, upon determining that a user equipment is subject to inter-frequency switching or inter-frequency RRC connection reestablishment, to perform exchange operations on a network-side measurement context, and to transmit to a destination radio access network device the network-side measurement context subjected to the exchange operations, wherein the source radio access network device is the radio access network device serving the user equipment prior to the inter-frequency switching or the radio access network device serving the user equipment prior to the inter-frequency RRC connection reestablishment; and the destination radio access network device configured to receive the network-side measurement context subjected to the exchange operations, wherein the destination radio access network device refers to the radio access network device serving the user equipment after the inter-frequency switching or the radio access network device serving the user equipment after the inter-frequency RRC connection reestablishment.

A radio access network system according to an embodiment of the invention includes:

a source radio access network device configured to transmit a network-side measurement context on the source radio access network device to a destination radio access network device, wherein the source radio access network device is the radio access network device serving a user equipment prior to inter-frequency switching or the radio access network device serving the user equipment prior to inter-frequency RRC connection reestablishment; and the destination radio access network device configured, upon determining that the user equipment is subject to the inter-frequency switching or the inter-frequency RRC connection reestablishment, to perform network-side measurement context exchange operations on the received network-side measurement context on the source radio access network device, wherein the destination radio access network device is the radio access network device serving the user equipment after the inter-frequency switching or the radio access network device serving the user equipment after the inter-frequency RRC connection reestablishment.

A radio access network device according to an embodiment of the invention includes:

a determination module configured to determine a network-side measurement context of a user equipment; and a full configuration module configured to perform full configuring on all measurement identities in the network-side measurement context, which are associated with source and destination frequencies, wherein the source frequency is the frequency of a cell where the user equipment resides prior to switching or the frequency of a cell where the user equipment resides prior to RRC connection reestablishment, the destination frequency is the frequency of a cell where the user equipment resides after the switching or the frequency of a cell where the user equipment resides after the RRC connection reestablishment, and the full configuring is resetting of an association relationship between a measurement identity, and a measurement object and a measurement reporting criterion respectively.

A radio access network system according to an embodiment of the invention includes:

a source radio access network device configured to determine whether to perform exchange operations on a network-side measurement context transmitted to a destination radio access network device, and upon determining the exchange operations to be performed, to transmit to the destination radio access network device the network-side measurement context subjected to the exchange operations together with an indicator of that the exchange operations are performed on the network-side measurement context, or upon determining no exchange operation to be performed, to transmit to the destination radio access network device the network-side measurement context without being subjected to any exchange operation together with an indicator of that no exchange operations is performed on the network-side measurement context, wherein the source radio access network device is the radio access network device serving a user equipment prior to inter-frequency switching or the radio access network device serving the user equipment prior to inter-frequency RRC connection reestablishment; and the destination radio access network device configured to perform no exchange operation on the received network-side measurement context when the received indicator indicates that the exchange operations are performed on the network-side measurement context; or to perform the exchange operations on the received network-side measurement context, or perform full configuring on all measurement identities in the received network-side measurement context, which are associated with source and destination frequencies, when the received indicator indicates that no exchange operation is performed on the network-side measurement context, wherein the destination radio access network device is the radio access network device serving the user equipment after the inter-frequency switching or the radio access network device serving the user equipment after the inter-frequency RRC connection reestablishment, and the full configuring is resetting of an association relationship between a measurement identity, and a measurement object and a measurement reporting criterion respectively.

A radio access network device according to an embodiment of the invention includes:

a transmission module configured, prior to inter-frequency switching for a user equipment or prior to inter-frequency RRC connection reestablishment for the user equipment, to determine whether to perform exchange operations on a network-side measurement context for transmission to a destination radio access network device prior to transmission of the network-side measurement context to the destination radio access network device; and upon determining the exchange operations to be performed, to transmit to the destination radio access network device the network-side measurement context subjected to the exchange operations, or upon determining no exchange operation to be performed, to transmit to the destination radio access network device the network-side measurement context without being subjected to any exchange operation, wherein the destination radio access network device is the radio access network device serving the user equipment after the inter-frequency switching or the radio access network device serving the user equipment after the inter-frequency RRC connection reestablishment; and an indication module configured to indicate, according to the network-side measurement context as transmitted, to the destination radio access network device whether the exchange operations are performed on the network-side measurement context.

A radio access network device according to an embodiment of the invention includes:

a reception module configured to receive a network-side measurement context transmitted from a source radio access network device, wherein the source radio access network device is the radio access network device serving a user equipment prior to inter-frequency switching or the radio access network device serving the user equipment prior to inter-frequency RRC connection reestablishment; and an exchange operation module configured to determine from an indicator whether to perform exchange operations on the network-side measurement context, wherein the indicator indicates to the destination radio access network device whether the exchange operations are performed on the network-side measurement context.

A radio access network device according to an embodiment of the invention includes:

a function determination module configured to determine whether the present radio access network device performs exchange operations on all network-side measurement contexts; and an indication module configured to indicate the determination result of the function determination module to a destination radio access network device, wherein the destination radio access network device is the radio access network device serving a user equipment after inter-frequency switching or the radio access network device serving the user equipment after inter-frequency RRC connection reestablishment.

Advantageous effects of the invention are as follows.

As can be apparent from the foregoing embodiments, respective behaviors of a source radio access network device and a destination radio access network device can be ascertained to thereby avoid an error due to inconsistency between a network-side measurement context and a UE-side measurement context. Furthermore the behaviors of the radio access network devices can be ascertained so that a variety of radio access network devices available from different manufacturers can be interconnected and intercommunicated.

DETAILED DESCRIPTION

The inventors have identified during making of the invention that the measurement context is updated, i.e., the foregoing exchange operations are performed, at the UE side as stipulated in the standard when inter-frequency switching or inter-frequency RRC connection reestablishment occurs with a UE. In order to maintain synchronization of a UE network-side measurement context with the UE-side context, a corresponding process also has to be performed at the network side. However for inter-eNB switching or reestablishment scenario, a drawback of the prior art lies in that whether the desired process at the network side is performed by a source radio access network device or a destination radio access network device has not been ascertained in the existing standard.

Then this issue has not be addressed in the standard, thus different manufacturers may have inconsistent understanding thereof and then the following consequences may arise.

Assumed a radio access network device manufacturer A considers that the exchange operations shall be performed by a destination radio access network device and a radio access network device manufacturer B considers that the exchange operations shall be performed by a source radio access network device.

1. When a UE is switched from a radio access network device available from the manufacturer A to that available from the manufacturer B, such operations may not be performed by any network device.

2. When the UE is switched from a radio access network device available from the manufacturer B to that available from the manufacturer A, such operations may be performed repeatedly by both the source radio access network device and the destination radio access network device, and the UE is switched twice, which is equivalent to absence of switching as in the first consequence.

Both repeated and absent of switching will result in inconsistence of a network-side measurement context in the destination radio access network device with that at the UE side. Consequential inconsistency of measurement configuration may arise between the network side and the UE side, and subsequently the destination radio access network device may perform improper measurement control on or improper handling of a measurement report result from the UE because it may be confused by measurement reports of source and destination frequencies.

As can be apparent from the foregoing analysis, an error of inconsistency between the network-side measurement context and that at the UE side may occur because whether the desired process at the network side is performed by the source radio access network device or the destination radio access network device has not been ascertained in the existing standard.

In view of this, an embodiment of the invention provides a method for processing a measurement context, and specific implementations of the invention will be described hereinafter with reference to the drawings.

Figure 1:
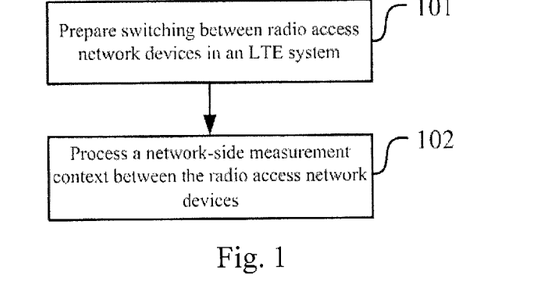
FIG. 1 is a schematic diagram of a flow implementing a method for processing a measurement context according to an embodiment of the invention.

FIG. 1 is a schematic diagram of a flow of implementing a method for processing a measurement context, and as illustrated, a process of processing a network-side measurement context may include the following operations 101 and 102.

The operation 101 is to prepare for switching between radio access network devices in an LTE system; and The operation 102 is to process a network-side measurement context between the radio access network devices.

The radio access network devices in an implementation may be a base station and/or a radio relay node. Since the radio relay node and the base station in both an LTE system and an LTE-A system are a radio access network device and their specifications of a network-side measurement context are identical, the base station and the radio relay node can be embodied similarly and therefore embodiments will be described taking a base station as an example.

Firstly a source base station and a destination base station will be defined, and this definition will apply to the following embodiments. A source base station refers to a base station serving a UE prior to inter-frequency switching or a base station serving the UE prior to inter-frequency RRC connection reestablishment.

A destination base station refers to a base station serving the UE after inter-frequency switching or a base station serving the UE after inter-frequency RRC connection reestablishment.

The First Embodiment

Figure 2:
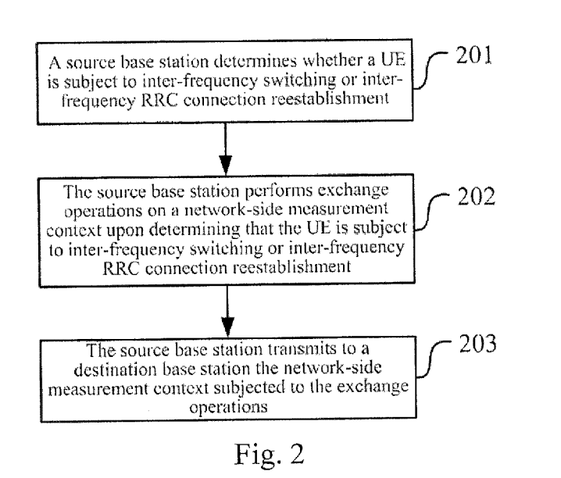
FIG. 2 is a schematic diagram of a flow of implementing a first embodiment of the invention.

FIG. 2 is a schematic diagram of a flow of implementing the first embodiment, and as illustrated, processing the network-side measurement context between the base stations may include the following operations 201 to 203.

In the operation 201, a source base station determines whether a UE is subject to inter-frequency switching or inter-frequency RRC connection reestablishment;

In the operation 202, the source base station performs exchange operations on the network-side measurement context upon determining that the UE is subject to inter-frequency switching or inter-frequency RRC connection reestablishment; and In the operation 203, the source base station transmits to a destination base station the network-side measurement context subjected to the exchange operations.

In this way, the destination base station may control the UE in a subsequent flow according to information of the network-side measurement context subjected to the exchange operations, which is transmitted from the source base station.

Apparently it has been ascertained in the first embodiment the exchange operations are performed by the source base station.

In an implementation, during preparation for switching between the base stations, the source base station judges whether a destination cell is a cell at a different frequency, and if so, the source base station performs the foregoing exchange operations on its own currently stored network-side measurement context and then transmits it to the destination base station, which in turn treats it as a result of the exchange operations without performing any exchange operation.

A benefit of the solution according to the first embodiment is a reduced processing burden on the destination base station.

Figure 3:
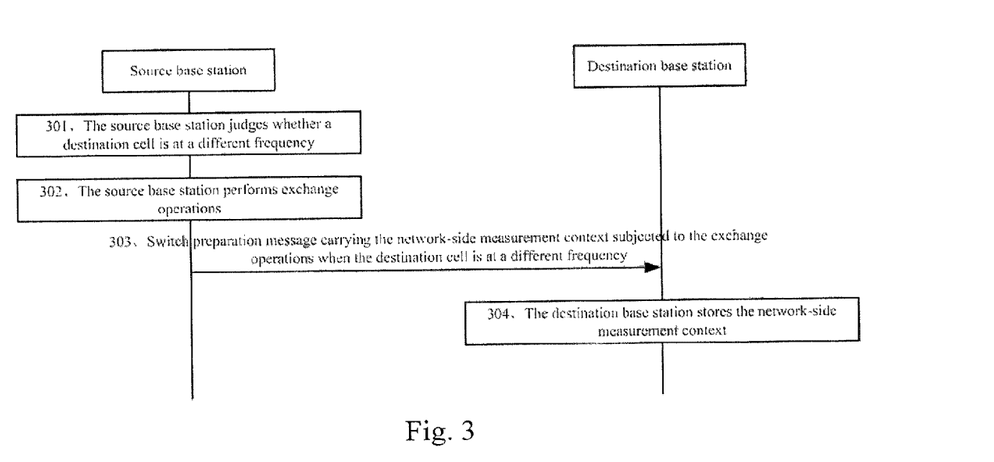
FIG. 3 is a schematic diagram of a specific flow of implementing the first embodiment of the invention.

FIG. 3 is a schematic diagram of a specific flow of implementing the first embodiment, and as illustrated, the implementation may include the following operations 301 to 304.

In the operation 301, a source base station judges whether a destination cell is at a different frequency;

In the operation 302, the source base station performs exchange operations;

In the operation 303, the source base station transmits to the destination base station a switch preparation message carrying the network-side measurement context subjected to the exchange operations when the destination cell is at a different frequency; and In the operation 304, the destination base station stores the network-side measurement context.

The Second Embodiment

Figure 4:
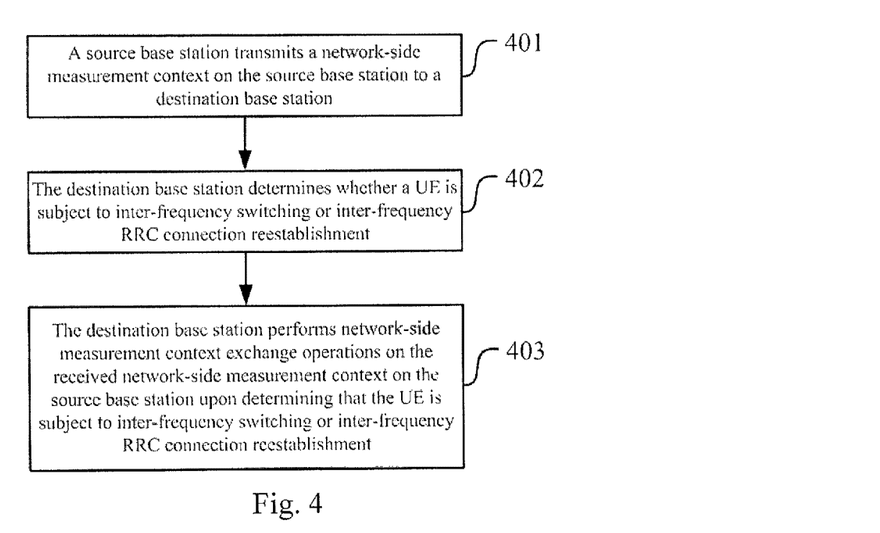
FIG. 4 is a schematic diagram of a flow of implementing a second embodiment of the invention.

FIG. 4 is a schematic diagram of a flow of implementing the second embodiment, and as illustrated, processing a network-side measurement context between base stations may include the following operations 401 to 403.

In the operation 401, a source base station transmits a network-side measurement context on the source base station to a destination base station;

In the operation 402, the destination base station determines whether a UE is subject to inter-frequency switching or inter-frequency RRC connection reestablishment; and In the operation 403, the destination base station performs network-side measurement context exchange operations on the received network-side measurement context on the source base station upon determining that the UE is subject to inter-frequency switching or inter-frequency RRC connection reestablishment.

In this way, the destination base station may control the UE in a subsequent flow according to information of the network-side measurement context on the destination base station, which is subjected to the exchange operations.

Apparently it has been ascertained in the second embodiment the exchange operations are performed by the destination base station.

In an implementation, during preparation for switching between the base stations, the source base station transmits its own stored network-side measurement context as it is to the destination base station (no matter whether a destination cell is at the same or different frequency), and the destination base station judges upon reception thereof whether a source cell is at a different frequency, and if so, then the destination base station performs the foregoing exchange operations on the received network-side measurement context.

A benefit of the solution according to the second embodiment is a reduced processing burden on the source base station, and especially when the source base station wishes a plurality of cells concurrently preparing for switching, which include cells at the same and different frequencies, it is not necessary for the source base station to perform the exchange operations repeatedly on its own stored network-side measurement context.

Figure 5:
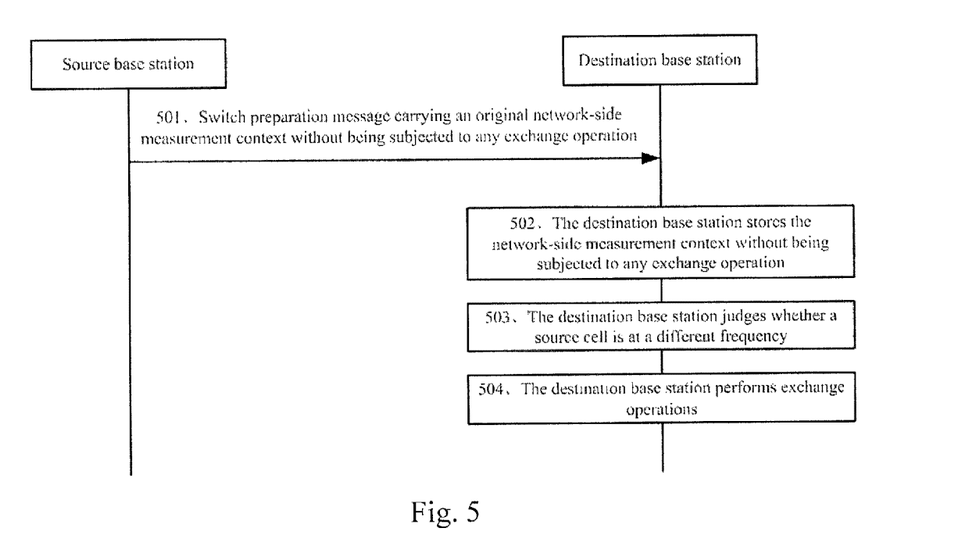
FIG. 5 is a schematic diagram of a specific flow of implementing the second embodiment of the invention.

FIG. 5 is a schematic diagram of a specific flow of implementing the second embodiment, and as illustrated, the implementation may include the following operations 501 to 504.

In the operation 501, a source base station transmits to a destination base station a switch preparation message carrying an original network-side measurement context without being subjected to any exchange operation;

In the operation 502, the destination base station stores the original network-side measurement context without being subjected to any exchange operation;

In the operation 503, the destination base station judges whether a source cell is at a different frequency; and In the operation 504, the destination base station performs exchange operations.

The Third Embodiment

Processing a network-side measurement context between base stations includes:

A destination base station performs full configuring on all the measurement identities in a received network-side measurement context, which are associated with source and destination frequencies.

Full configuring as mentioned here refers to resetting of an association relationship between a measurement identity, and a measurement object and a measurement reporting criterion respectively. Furthermore, configuration information required for full configuring as mentioned here can be transmitted to the source base station by being put in a switch command generated by the destination base station in the stage of preparing for switching (and thereafter the source base station can transmit the switch command to a UE) or can be transmitted from the destination base station directly to the UE in an RRC message after the UE is switched or reestablished to the destination base station.

Particularly the source frequency refers to the frequency of a cell where the UE resides prior to switching or the frequency of a cell where the UE resides prior to RRC connection reestablishment, and the destination frequency refers to the frequency of a cell where the UE resides after switching or the frequency of a cell where the UE resides after RRC connection reestablishment.

In this way, the destination base station controls the UE in a subsequent flow according to information of the network-side measurement context on the destination base station, which is subjected to full configuring.

In an implementation of this solution, the destination base station performs no process on a measurement report transmitted from the UE, which is relevant to any of the measurement identities associated with the source and destination frequencies, until full configuring is performed on all the measurement identities during inter-frequency switching or inter-frequency reestablishment.

In this solution, the destination base station performs full configuring on all the measurement identities associated with the source and destination frequencies prior to an effective process on any measurement report, thus no confusion will arise although an RRC configuration message (e.g., a switch command, or an RRC reconfiguration message following RRC connection reestablishment) may consequentially be made larger than in the first and second embodiments.

The Fourth Embodiment

Figure 6:
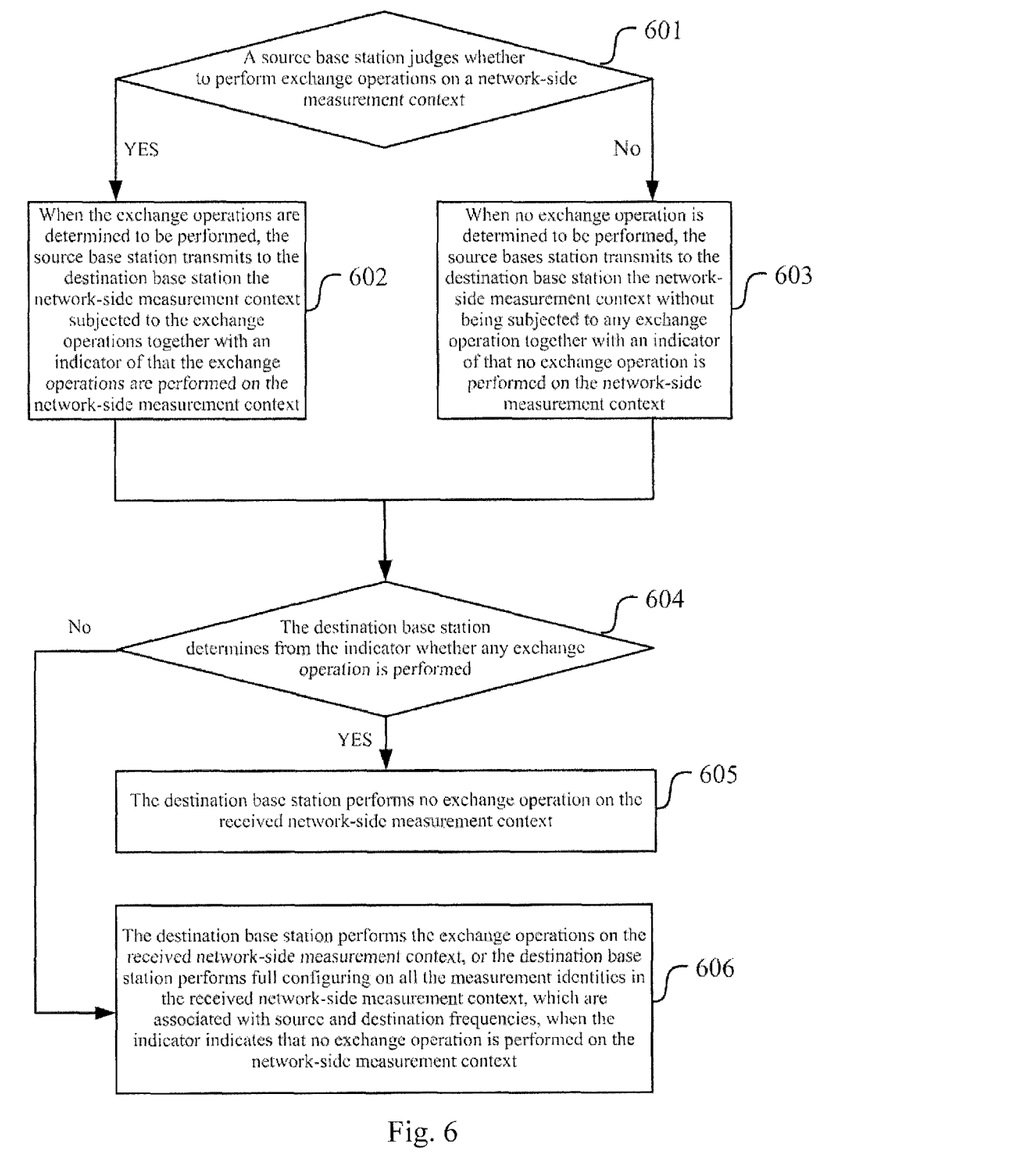
FIG. 6 is a schematic diagram of a flow of implementing a fourth embodiment of the invention.

FIG. 6 is a schematic diagram of a flow of implementing a fourth embodiment, and as illustrated in FIG. 6, processing a network-side measurement context between base stations may include the following operations 601 to 606.

In the operation 601, a source base station judges whether to perform exchange operations on a network-side measurement context for transmission to a destination base station, and if so, then the flow goes to the operation 602; otherwise, the flow goes to the operation 603;

In the operation 602, when the exchange operations are determined to be performed, the source base station transmits to the destination base station the network-side measurement context subjected to the exchange operations together with an indicator of that the exchange operations are performed on the network-side measurement context, and the flow goes to the operation 604;

In the operation 603, when no exchange operation is determined to be performed, the source bases station transmits to the destination base station the network-side measurement context without being subjected to any exchange operation together with an indicator of that no exchange operation is performed on the network-side measurement context, and the flow goes to the operation 604;

In the operation 604, the destination base station determines from the indicator whether any exchange operation is performed, and if so, then the flow goes to the operation 605; otherwise, the flow goes to the operation 606;

In the operation 605, the destination base station performs no exchange operation on the received network-side measurement context when the indicator indicates that the exchange operations are performed on the network-side measurement context; and In the operation 606, the destination base station performs the exchange operations on the received network-side measurement context, or the destination base station performs full configuring on all the measurement identities in the received network-side measurement context, which are associated with source and destination frequencies, when the indicator indicates that no exchange operation is performed on the network-side measurement context.

Full configuring as mentioned here refers to resetting of an association relationship between a measurement identity, and a measurement object and a measurement reporting criterion respectively. Furthermore, configuration information required for full configuring as mentioned here can be transmitted to the source base station by being put in a switch command generated by the destination base station in the stage of preparing for switching (and thereafter the source base station can transmit the switch command to a UE) or can be transmitted from the destination base station directly to the UE in an RRC message after the UE is switched or reestablished to the destination base station.

In this solution, the source base station decides whether to perform the exchange operations, and if so, then the source base station transmits to the destination the measurement context subjected to the exchange operations together with the indicator of "Already Exchanged"; otherwise, the source base station transmits to the destination the original measurement context without being subjected to any exchange operation together with the indicator of "Not Exchanged"

In this way, the destination base station controls the UE in a subsequent flow according to information of the network-side measurement context, transmitted from the source base station, subjected to the exchange operations, when the indicator indicates that the exchange operations are performed on the network-side measurement context; or when the indicator indicates that no exchange operation is performed on the network-side measurement context, the destination base station controls the UE according to information of the network-side measurement context on the destination base station, which is subjected to the exchange operations, or the destination base station controls the UE according to information of the network-side measurement context on the destination base station, which is subjected to full configuring.

Apparently in this solution, the exchange operations are performed selectively by the source base station, which in turn indicates whether it has performed the exchange operations to the destination base station.

In an implementation, the source base station selectively performs the exchange operations and can carry an indicator in a switch preparation message to indicate whether it has performed the exchange operations to the destination base station.

If the source base station decides to perform the exchange operations, then it performs the exchange operations and indicates "Already Exchanged" in the switch preparation message, and the destination base station treats it as the result of the exchange operations upon reception thereof without performing any exchange operation.

If the source base station decides to perform no exchange operation, then it performs no exchange operation and indicates "Not Exchanged" in the switch preparation message, and the destination base station can proceed in one of the following two processing modes upon reception thereof:

1. the exchange operations are performed.
2. no process is performed on a measurement report transmitted from the UE, which is relevant to any of the measurement identities associated with the source and destination frequencies, until full configuring is performed on all the measurement identities during inter-frequency switching or inter-frequency reestablishment.

This solution is a combination of the second and third embodiments. An advantage thereof is flexibility thereof because it will suffice if the devices are adapted slightly to a capability of processing the indicator of "Already Exchanged" and the indicator of "Not Exchanged" transmitted from the source base station.

The Fifth Embodiment

Of course, there is another possible implementation in which the feature of whether a source base station performs "exchange operations" on all the network-side measurement contexts can be deemed inherent, that is, the source base station can perform the exchange operations for any process of preparing for inter-frequency switching once the source base station is capable of this; and on the contrary, the source base station will perform no exchange operation for any process of preparing for inter-frequency switching once the source base station is incapable of this. In this solution, the foregoing indicator can be signaled to the opposite party in an implementation during setting-up of an interface (e.g., an X2 or S1 interface) between the base stations. This solution has the same technical effect as the solution in the foregoing embodiment where the indicator is carried in each switch preparation message.

Processing a network-side measurement context between radio access network devices may include:

a source radio access network device indicates in an indicator to a destination radio access network device whether to perform exchange operations on all the network-side measurement contexts on the source radio access network device, where the source radio access network device refers to the radio access network device serving a user equipment prior to inter-frequency switching or the radio access network device serving the user equipment prior to inter-frequency RRC connection reestablishment;

when the indicator indicates that the exchange operations are performed on all the network-side measurement contexts, the destination radio access network device performs no exchange operation on any received network-side measurement context; and when the indicator indicates that the exchange operations are not performed on all the network-side measurement contexts, the destination radio access network device performs the exchange operations on a received network-side measurement context, or the destination radio access network device performs full configuring on all the measurement identities in the network-side measurement context, which are associated with source and destination frequencies, where the destination radio access network device refers to the radio access network device serving the user equipment after inter-frequency switching or the radio access network device serving the user equipment after inter-frequency RRC connection reestablishment, and full configuring refers to resetting of an association relationship between a measurement identity, and a measurement object and a measurement reporting criterion respectively.

In an implementation, the source radio access network device can indicate to the destination radio access network device during setting-up of an interface between the radio access network devices.

In an implementation, the following may be further included:

when the indicator indicates that the exchange operations are performed on all the network-side measurement contexts, the destination radio access network device controls the user equipment according to the information of the network-side measurement context, transmitted from the source radio access network device, subjected to the exchange operations; and when the indicator indicates that no exchange operation is performed on any network-side measurement context, the destination radio access network device controls the user equipment according to the information of the network-side measurement context on the destination radio access network device subjected to the exchange operations, or the destination radio access network device controls the user equipment according to the information of the network-side measurement context on the destination radio access network device, which is subjected to full configuring.

Based upon the same inventive idea, embodiments of the invention further provide a radio access network system and radio access network devices, and since these devices address the issue under a similar principle to the method for processing a measurement context, reference can be made to the implementation of the method of the invention for details of implementations of these devices, and a repeated description thereof will be omitted here.

Figure 7:
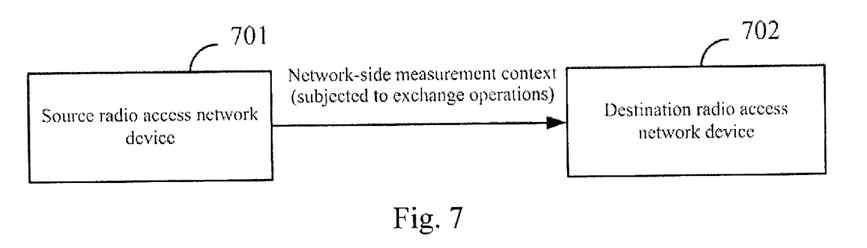
FIG. 7 is a schematic diagram of the structure of a first radio access network system according to an embodiment of the invention.

FIG. 7 is a schematic diagram of the structure of a first radio access network system, and as illustrated, the system may include:

a source radio access network device 701 configured, upon determining that a UE is subject to inter-frequency switching or inter-frequency RRC connection reestablishment, to perform exchange operations on a network-side measurement context, and to transmit to a destination radio access network device the network-side measurement context subjected to the exchange operations, where the source radio access network device refers to the radio access network device serving the UE prior to inter-frequency switching or the radio access network device serving the UE prior to inter-frequency RRC connection reestablishment; and the destination radio access network device 702 configured to receive the network-side measurement context subjected to the exchange operations, where the destination radio access network device refers to the radio access network device serving the UE after inter-frequency switching or the radio access network device serving the UE after inter-frequency RRC connection reestablishment.

In an implementation, the destination radio access network device may further be configured to control the UE according to information of the network-side measurement context, transmitted from the source radio access network device, subjected to the exchange operations.

In an implementation, the radio access network devices may be a base station and/or a radio relay node.

Figure 8:
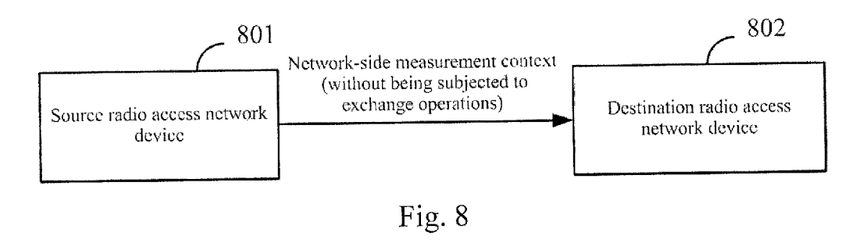
FIG. 8 is a schematic diagram of the structure of a second radio access network system according to an embodiment of the invention.

FIG. 8 is a schematic diagram of the structure of a second radio access network system, and as illustrated, the system may include:

a source radio access network device 801 configured to transmit a network-side measurement context on the source radio access network device to a destination radio access network device, where the source radio access network device refers to the radio access network device serving a UE prior to inter-frequency switching or the radio access network device serving the UE prior to inter-frequency RRC connection reestablishment; and the destination radio access network device 802 configured, upon determining that the UE is subject to inter-frequency switching or inter-frequency RRC connection reestablishment, to perform network-side measurement context exchange operations on the received network-side measurement context on the source radio access network device, where the destination radio access network device refers to the radio access network device serving the UE after inter-frequency switching or the radio access network device serving the UE after inter-frequency RRC connection reestablishment.

In an implementation, the destination radio access network device may further be configured to control the UE according to information of the network-side measurement context on the destination radio access network device subjected to the exchange operations.

In an implementation, the radio access network devices may be a base station and/or a radio relay node.

Figure 9:
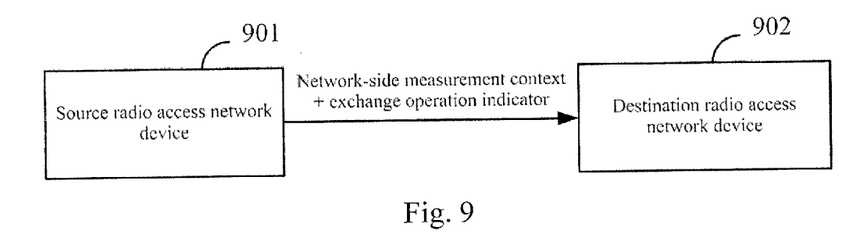
FIG. 9 is a schematic diagram of the structure of a third radio access network system according to an embodiment of the invention.

FIG. 9 is a schematic diagram of the structure of a third radio access network system, and as illustrated, the system may include:

a source radio access network device 901 configured to determine whether to perform exchange operations on a network-side measurement context transmitted to a destination radio access network device, and upon determining the exchange operations to be performed, to transmit to the destination radio access network device the network-side measurement context subjected to the exchange operations together with an indicator of that the exchange operations are performed on the network-side measurement context, or upon determining no exchange operation to be performed, to transmit to the destination radio access network device the network-side measurement context without being subjected to any exchange operation together with an indicator of that no exchange operations is performed on the network-side measurement context, where the source radio access network device refers to the radio access network device serving a UE prior to inter-frequency switching or the radio access network device serving the UE prior to inter-frequency RRC connection reestablishment; and the destination radio access network device 902 configured to perform no exchange operation on the received network-side measurement context when the indicator indicates that the exchange operations are performed on the network-side measurement context; or to perform the exchange operations on the received network-side measurement context or perform full configuring on measurement identities when the indicator indicates that no exchange operation is performed on the network-side measurement context, where the destination radio access network device refers to the radio access network device serving the UE after inter-frequency switching or the radio access network device serving the UE after inter-frequency RRC connection reestablishment.

In an implementation, the destination radio access network device may further be configured to control the UE according to information of the network-side measurement context, transmitted from the source radio access network device, subjected to the exchange operations, when the indicator indicates that the exchange operations are performed on the network-side measurement context; or to control the UE according to information of the network-side measurement context on the destination radio access network device subjected to the exchange operations, or control the UE according to information of the network-side measurement context on the destination radio access network device subjected to full configuring, when the indicator indicates that no exchange operation is performed on the network-side measurement context.

In an implementation, the radio access network devices may be a base station and/or a radio relay node.

Figure 10:
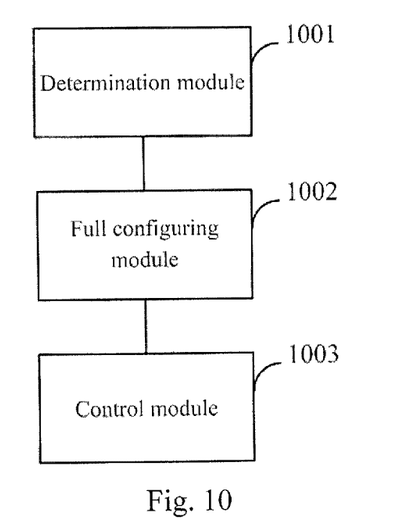
FIG. 10 is a schematic diagram of the structure of a first radio access network device according to an embodiment of the invention.

FIG. 10 is a schematic diagram of the structure of a first radio access network device, and as illustrated, the radio access network device may include:

a determination module 1001 configured to determine a network-side measurement context of a UE; and a full configuration module 1002 configured to perform full configuring on all the measurement identities in the network-side measurement context, where a source frequency refers to the frequency of a cell where the UE resides prior to switching or the frequency of a cell where the UE resides prior to RRC connection reestablishment, and a destination frequency refers to the frequency of a cell where the UE resides after switching or the frequency of a cell where the UE resides after RRC connection reestablishment.

The radio access network device may further include:

a control module 1003 configured to control the UE according to information of the network-side measurement context subjected to full configuring.

In an implementation, the radio access network device may be a base station and/or a radio relay node.

Figure 11:
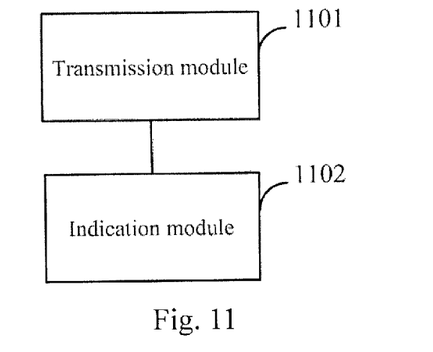
FIG. 11 is a schematic diagram of the structure of a second radio access network device according to an embodiment of the invention.

FIG. 11 is a schematic diagram of the structure of a second radio access network device, and as illustrated, the radio access network device may include:

a transmission module 1101 configured, prior to inter-frequency switching for a UE or prior to inter-frequency RRC connection reestablishment for the UE, to determine whether to perform exchange operations on a network-side measurement context for transmission to a destination radio access network device prior to transmission of the network-side measurement context to the destination radio access network device; and upon determining the exchange operations to be performed, to transmit to the destination radio access network device the network-side measurement context subjected to the exchange operations, or upon determining no exchange operation to be performed, to transmit to the destination radio access network device the network-side measurement context without being subjected to any exchange operation, where the destination radio access network device refers to the radio access network device serving the user equipment after inter-frequency switching or the radio access network device serving the user equipment after inter-frequency RRC connection reestablishment; and an indication module 1102 configured to indicate, according to the result of the exchange operations on the transmitted network-side measurement context, to the destination radio access network device whether the exchange operations are performed on the network-side measurement context.

In an implementation, the radio access network devices may be a base station and/or a radio relay node.

Figure 12:
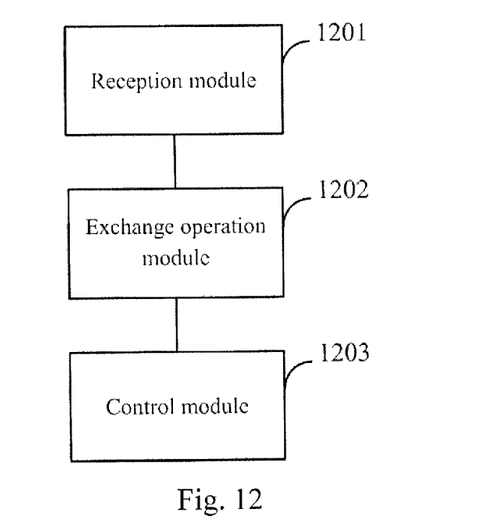
FIG. 12 is a schematic diagram of the structure of a third radio access network device according to an embodiment of the invention.

FIG. 12 is a schematic diagram of the structure of a third radio access network device, and as illustrated, the radio access network device may include:

a reception module 1201 configured to receive a network-side measurement context transmitted from a source radio access network device, where the source radio access network device refers to the radio access network device serving a UE prior to inter-frequency switching or the radio access network device serving the UE prior to inter-frequency RRC connection reestablishment; and an exchange operation module 1202 configured to determine from an indicator whether to perform exchange operations on the network-side measurement context, where the indicator indicates to the destination radio access network device whether the exchange operations are performed on the network-side measurement context.

In an implementation, the exchange operation module may further be configured to perform no exchange operation on the received network-side measurement context when the indicator indicates that the exchange operations are performed on the network-side measurement context; or to perform the exchange operations on the received network-side measurement context, or perform full configuring on measurement identities, when the indicator indicates that no exchange operation is performed on the network-side measurement context.

In an implementation, the radio network access device may further include:

a control module 1203 configured to control the UE according to information of the network-side measurement context, transmitted from the source radio access network device, subjected to the exchange operations, when the indicator indicates that the exchange operations are performed on the network-side measurement context; or to control the UE according to information of the network-side measurement context on the present radio access network device subjected to the exchange operations, or control the UE according to information of the network-side measurement context on the present radio access network device subjected to full configuring, when the indicator indicates that no exchange operation is performed on the network-side measurement context.

Figure 13:
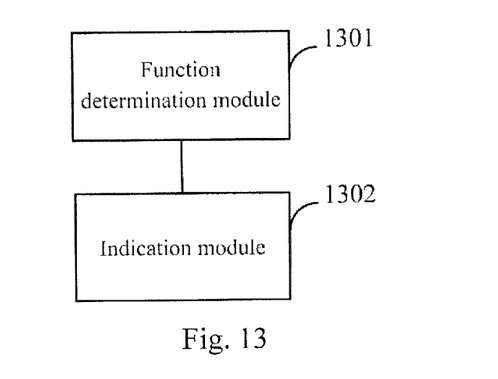
FIG. 13 is a schematic diagram of the structure of a fourth radio access network device according to an embodiment of the invention.

FIG. 13 is a schematic diagram of the structure of a fourth radio access network device, and as illustrated, the radio access network device may include:

a function determination module 1301 configured to determine whether the present radio access network device performs exchange operations on all the network-side measurement contexts; and an indication module 1302 configured to indicate the determination result of the function determination module to a destination radio access network device, where the destination radio access network device refers to the radio access network device serving a user equipment after inter-frequency switching or the radio access network device serving the user equipment after inter-frequency RRC connection reestablishment.

The instruction module is configured to indicate the destination radio access network device during setting-up of an interface between the radio access network devices.

In an implementation, the radio access network devices may be a base station and/or a radio relay node.

For the sake of a convenient description, the respective parts of the devices have been functionally described as respective modules or units. Of course, the functions of the respective modules or units can be performed in the same one or more than one items of software or hardware to put the invention into practice.

As can be apparent from the foregoing embodiments, respective behaviors of a source radio access network device and a destination radio access network device can be ascertained to thereby avoid an error due to inconsistency between a network-side measurement context and a UE-side measurement context. Furthermore the behaviors of the radio access network devices can be ascertained so that a variety of radio access network devices available from different manufacturers can be interconnected and intercommunicated.

Those skilled in the art shall appreciate that the embodiments of the invention can be embodied as a method, system or computer program product. Therefore, the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, device (system) and computer program product according to the embodiments of the invention. It shall be appreciated that respective flows and/or blocks in the flow chart and/or the block diagram and combinations of the flows and/or blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instructions means which perform the functions specified in the flow(s) of the flow chart and/or the block(s) of the block diagram.

These computer program instructions can also be loaded onto the computer or the other programmable data processing device so that a series of operational flows are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

The invention claimed is:

1. A method for processing a measurement context, comprising:

processing a network-side measurement context between a source radio access network device and a destination radio access network device when a User Equipment (UE) in a Long Term Evolution system switches from the source radio access network device to the destination radio access network device through an inter-frequency switching or an inter-frequency Radio Resource Control (RRC) connection reestablishment, wherein the source radio access network device is a radio access network device serving the UE prior to the inter-frequency switching or the inter-frequency RRC connection reestablishment; and the destination radio access network device is a radio access network device serving the UE after the inter-frequency switching or the inter-frequency RRC connection reestablishment, and the network-side measurement context comprises measurement objects and measurement identities, and wherein the processing the network-side measurement context between the source radio access network device and the destination radio access network device comprises:

the source radio access network device transmitting the network-side measurement context on the source radio access network device to the destination radio access network device, and the destination radio access network device performing network-side measurement context exchange operations on the received network-side measurement context from the source radio access network device upon determining that the UE is subject to the inter-frequency switching or the inter-frequency RRC connection reestablishment, wherein the exchange operations comprises:

locating all measurement identities associated with measurement objects corresponding to destination frequencies and associating the located measurement identities onto measurement objects corresponding to source frequencies; and locating all measurement identities associated with measurement objects corresponding to the source frequencies and associating the located measurement identities onto measurement objects corresponding to the destination frequencies, wherein the source frequencies are frequencies of a cell where the UE resides prior to the inter-frequency switching or the inter-frequency RRC connection reestablishment; and the destination frequencies are frequencies of a cell where the UE resides after the inter-frequency switching or the inter-frequency RRC connection reestablishment.

2. The method of claim 1, further comprising:
the destination radio access network device controlling the UE according to information of the network-side measurement context on the destination radio access network device subjected to the exchange operations.

3. A method for processing a measurement context, comprising:
preparing for switching between radio access network devices in a Long Term Evolution system; and
processing a network-side measurement context between the radio access network devices;
and wherein the processing the network-side measurement context between the radio access network devices comprises:
a destination radio access network device performing full configuring on all measurement identities in the network-side measurement context, which are associated with source and destination frequencies,
wherein the destination radio access network device is the radio access network device serving a user equipment after inter-frequency switching or the radio access network device serving the user equipment after inter-frequency Radio Resource Control, RRC, connection reestablishment,
the source frequency is the frequency of a cell where the user equipment resides prior to the switching or the frequency of a cell where the user equipment resides prior to the RRC connection reestablishment,
the destination frequency is the frequency of a cell where the user equipment resides after the switching or the frequency of a cell where the user equipment resides after the RRC connection reestablishment, and
the full configuring is resetting of an association relationship between a measurement identity, and a measurement object and a measurement reporting criterion respectively.

4. The method of claim 3, further comprising:
the destination radio access network device controlling the user equipment according to information of the network-side measurement context information on the destination radio access network device subjected to the full configuring.

5. A radio access network system, comprising a source radio access network device and a destination radio access network device,
wherein a User Equipment (UE) in a Long Term Evolution system switches from the source radio access network device to the destination radio access network device through an inter-frequency switching or an inter-frequency Radio Resource Control (RRC) connection reestablishment; and the source radio access network device is a radio access network device serving the UE prior to the inter-frequency switching or the inter-frequency RRC connection reestablishment, and the destination radio access network device is a radio access network device serving the UE after the inter-frequency switching or the inter-frequency RRC connection reestablishment;

and wherein the source radio access network device is configured to transmit a network-side measurement context on the source radio access network device to the destination radio access network device; wherein the network-side measurement context comprises measurement object and measurement identities
and
the destination radio access network device is configured, upon determining that the UE is subject to the inter-frequency switching or the inter-frequency RRC connection reestablishment, to perform network-side measurement context exchange operations on the received network-side measurement context from the source radio access network device,
wherein the exchange operations comprises:
locating all measurement identities associated with measurement objects corresponding to destination frequencies and associating the located measurement identities onto measurement objects corresponding to source frequencies; and
locating all measurement identities associated with measurement objects corresponding to the source frequencies and associating the located measurement identities onto measurement objects corresponding to the destination frequencies,
wherein the source frequencies are frequencies of a cell where the UE resides prior to the inter-frequency switching or the inter-frequency RRC connection reestablishment; and the destination frequencies are frequencies of a cell where the UE resides after the inter-frequency switching or the inter-frequency RRC connection reestablishment.

6. The radio access network system of claim 5, wherein the destination radio access network device is further configured to:
control the user equipment according to information of the network-side measurement context on the radio access network device subjected to the exchange operations.

7. The radio access network system of claim 6, wherein the radio access network devices are a base station and/or a radio relay node.

8. The radio access network system of claim 5, wherein the radio access network devices are a base station and/or a radio relay node.

9. A radio access network device, comprising:
a determination module configured to determine a network-side measurement context of a user equipment; and
a full configuration module configured to perform full configuring on all measurement identities in the network-side measurement context, which are associated with source and destination frequencies,
wherein the source frequency is the frequency of a cell where the user equipment resides prior to switching or the frequency of a cell where the user equipment resides prior to Radio Resource Control, RRC, connection reestablishment,
the destination frequency is the frequency of a cell where the user equipment resides after the switching or the frequency of a cell where the user equipment resides after the RRC connection reestablishment, and the full configuring is resetting of an association relationship between a measurement identity, and a measurement object and a measurement reporting criterion respectively.

10. The radio access network device of claim 9, further comprising:
a control module configured to control the user equipment according to information of the network-side measurement context subjected to the full configuring.

11. The radio access network device of claim 10, wherein the radio access network device is a base station and/or a radio relay node.

12. The radio access network device of claim 9, wherein the radio access network device is a base station and/or a radio relay node.

13. A radio access network device, comprising:
a transmission module configured, prior to inter-frequency switching for a user equipment or prior to inter-frequency Radio Resource Control (RRC) connection reestablishment for the user equipment, to determine whether to perform exchange operations on a network-side measurement context for transmission to a destination radio access network device prior to transmission of the network-side measurement context to the destination radio access network device; and upon determining the exchange operations to be performed, to transmit to the destination radio access network device the network-side measurement context subjected to the exchange operations, or upon determining no exchange operation to be performed, to transmit to the destination radio access network device the network-side measurement context without being subjected to any exchange operation,
wherein the destination radio access network device is the radio access network device serving the user equipment after the inter-frequency switching or the inter-frequency RRC connection reestablishment, and the network-side measurement context comprises measurement objects and measurement identities; and
an indication module configured to indicate, according to a result of the exchange operations on the transmitted network-side measurement context, to the destination radio access network device whether the exchange operations are performed on the network-side measurement context,
wherein the exchange operations comprises:
locating all measurement identities associated with measurement objects corresponding to destination frequencies and associating the located measurement identities onto measurement objects corresponding to source frequencies; and
locating all measurement identities associated with measurement objects corresponding to the source frequencies and associating the located measurement identities onto measurement objects corresponding to the destination frequencies,
and wherein the source frequencies are frequencies of a cell where the user equipment resides prior to the inter-frequency switching or the inter-frequency RRC connection reestablishment; and the destination frequencies are frequencies of a cell where the user equipment resides after the inter-frequency switching or the inter-frequency RRC connection reestablishment.

14. The radio access network device of claim 13, wherein the radio access network devices are a base station and/or a radio relay node.

15. A radio access network device, comprising:
a function determination module configured to determine whether the present radio access network device performs exchange operations on all network-side measurement contexts; and
an indication module configured to indicate the determination result of the function determination module to a destination radio access network device,
wherein the destination radio access network device is a radio access network device serving a user equipment after inter-frequency switching or inter-frequency Radio Resource Control (RRC) connection reestablishment, the network-side measurement contexts comprise measurement objects and measurement identities,
and the exchange operations comprises:
locating all measurement identities associated with measurement objects corresponding to destination frequencies and associating the located measurement identities onto measurement objects corresponding to source frequencies; and
locating all measurement identities associated with measurement objects corresponding to the source frequencies and associating the located measurement identities onto measurement objects corresponding to the destination frequencies,
and wherein the source frequencies are frequencies of a cell where the user equipment resides prior to the inter-frequency switching or the inter-frequency RRC connection reestablishment; and the destination frequencies are frequencies of a cell where the user equipment resides after the inter-frequency switching or the inter-frequency RRC connection reestablishment.

16. The radio access network device of claim 15, wherein the indication module is configured to indicate the destination radio access network device during setting-up of an interface between the radio access network devices.

17. The radio access network device of claim 16, wherein the radio access network devices are a base station and/or a radio relay node.

18. The radio access network device of claim 15, wherein the radio access network devices are a base station and/or a radio relay node.

* * * * *